US006712314B2

(12) United States Patent
Stephan

(10) Patent No.: US 6,712,314 B2
(45) Date of Patent: Mar. 30, 2004

(54) METHOD FOR THE CONTROL OF AERO GAS TURBINE ENGINES

(75) Inventor: Volker Stephan, Blankenfelde (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 10/012,376

(22) Filed: Dec. 12, 2001

(65) Prior Publication Data

US 2002/0117582 A1 Aug. 29, 2002

(30) Foreign Application Priority Data

Dec. 14, 2000 (DE) .......................... 100 62 252

(51) Int. Cl.[7] .......................... B64D 31/00; F02D 9/00
(52) U.S. Cl. ................... 244/53 R; 123/402; 416/34; 60/239
(58) Field of Search ................ 123/330, 331, 123/339.16, 402; 244/53 R; 60/239; 416/34

(56) References Cited

U.S. PATENT DOCUMENTS

| 2,853,851 A | 9/1958 | Chandler |
| 3,084,889 A | 4/1963 | Irbitis |
| 3,518,023 A | 6/1970 | Britten et al. |
| 3,689,175 A | 9/1972 | Hartzell et al. |
| 3,811,273 A | 5/1974 | Martin |
| 4,009,849 A | * 3/1977 | Eickmann .................. 244/53 R |
| 4,245,955 A | 1/1981 | Lambertson |
| 4,296,601 A | 10/1981 | Martin |
| 4,303,976 A | 12/1981 | Joby |
| 4,550,561 A | 11/1985 | Coffinberry |
| 5,058,376 A | 10/1991 | Snow |
| 5,137,230 A | * 8/1992 | Coffinberry .............. 244/118.5 |
| 5,221,185 A | 6/1993 | Pla et al. |
| 5,769,317 A | 6/1998 | Sokhey et al. |
| 5,939,800 A | * 8/1999 | Artinian et al. ................ 307/64 |
| 6,041,273 A | 3/2000 | Burken et al. |
| 6,105,901 A | 8/2000 | Ulanoski et al. |

FOREIGN PATENT DOCUMENTS

| DE | 3938440 | 6/1990 |
| EP | 322342 | 6/1989 |
| FR | 836375 | 1/1939 |

* cited by examiner

*Primary Examiner*—Robert P. Swiatek
(74) *Attorney, Agent, or Firm*—Davidson Berquist Klima & Jackson, LLP

(57) ABSTRACT

The exchange, removal or addition, as applicable, of media and/or power is provided between the individual shafts of an engine, between individual engines and between the engines and the aircraft. Thus, additional degrees of freedom are provided, enabling engine parameters to be addressed in terms of a reduction or avoidance of negative resonances or beats. It also provides an ability to alter thrust from engines of a multi-engined aircraft to reduce rudder trim.

30 Claims, No Drawings

METHOD FOR THE CONTROL OF AERO GAS TURBINE ENGINES

This application claims priority to German Patent Application 10062252.6, filed Dec. 14, 2000, which application is incorporated by reference herein.

BACKGROUND

This invention relates to a method for the control of aero gas turbine engines in aircraft having at least two such engines.

In certain flight phases, some engine frequencies can excite vibrations in the aircraft, these being caused by the rotational speed of the high-pressure shaft (NH) or the low-pressure shaft (NL), respectively. These vibrations are perceived by the passengers as noise or oscillations. Also, since the engines rarely operate at the same rotational speed, interference can occur between the engines. This gives rise to beats or standing waves. Where the rotational speed of the low-pressure shaft is controlled, i.e. only the low pressure compressors are synchronized, the rotational speed of the high-pressure shaft will remain a potential cause of disturbance.

Among others, the causes for different engine behavior are: The disparity of age between engines upon replacement of one of the engines. Inaccuracies in the measured quantities, these resulting in the generation of deviant controlled variables. The unavoidable manufacturing tolerances which entail similar effects.

Normally, aero engines are both considered and controlled individually. Only in specific cases, the interaction of aero engines is taken into consideration, for example in emergency or thrust vectoring situations.

Few cases are known in which both engines are linked together in terms of control during operation. For example, in the case of a failure of the vertical rudder, the two engines can be operated with different thrust, this enabling turns to be flown. Also, thrust vectoring is known in military applications (cf. U.S. Pat. No. 5,769,317 or 6,105,901, for example).

The state of the art entails many, significant disadvantages. It does not provide for the interaction between two or more engines while making use of the components already available in the engines and in the aircraft. This deficiency leads to a higher noise level in the aircraft cabin. Aircraft manufacturers have to fit more attenuation material, resulting in higher mass and increased costs. Furthermore, higher investments have to be made into vibration reduction during aircraft development.

DESCRIPTION OF THE INVENTION

In a broad aspect, the present invention provides for avoidance of vibrations and the resulting generation of undesired noise during the flight of an aircraft.

It is the principal object of the present invention to remedy said problem by providing a method wherein energy, fluid and/or bleed air is removed from or supplied to at least one engine of an aircraft to control the operation of the at least one engine. Further advantageous aspects of the present invention will be become apparent from the following description.

Therefore, in accordance with the present invention, provision is made for the indirect change of the engine parameters. This can be accomplished by the removal or addition of power, energy, fluids and/or other media. As one of the possibilities, bleed air can be taken off the engine. In accordance with the present invention, said measures will not be applied equally to all engines, but differences between the individual engines will be permitted and induced deliberately to effect the desired change of the engine parameters.

The present invention, therefore, enables the rotational speeds of the engines (aero gas turbines) to be changed in such a manner that oscillations and vibrations which cause undesired noise are avoided.

As a positive effect, the resultant, additional change in thrust of the individual engines enables vertical rudder trimming to be reduced. Since no aircraft flies absolutely straight, a certain degree of vertical rudder trimming always has to be applied. Of course, this entails a greater aerodynamic resistance and, in consequence, impairs the efficiency of the entire aircraft. As a further positive effect, the measures according to the present invention, by exerting an influence on the engine parameters, provide for compensation of differences in yaw.

Since the negative effects known in the state of the art are mostly limited to a very narrow frequency regime (resonant frequency), a minor shift of the excitation frequency (i.e. the rotational speeds) by the measures according to the present invention can be sufficient to effectively reduce, or completely eliminate, these negative effects.

The method according to the present invention can, for example, be implemented by the following measures:

A hydraulic power transmission (positive/negative) between engines, which comprise hydraulic motors/pumps, can be influenced in dependence of the operating conditions. Taking hydraulic power for aircraft applications from the engines to different amounts allows the engine parameters to be changed.

A hydraulic coupling of the shafts of an engine enables the rotational speeds to be shifted relative to each other.

The present invention also provides for electric power transmission (positive/negative), which, in particular, can easily be implemented on "fully electric" engines with power exchange between the shafts and the individual engines.

A further, particularly efficient measure is the take-off of bleed air from one of the engines.

Apparently, the present invention provides for a combination of said measures and effects in order to achieve a more effective overall influence on a specific parameter, for example the speed of the low-pressure shaft. Furthermore, such combination can give rise to more degrees of freedom, this enabling secondary parameters, for example the speed of the high-pressure shaft, to be optimized in addition to a primary parameter, for example the speed of the low-pressure shaft. This is particularly advantageous in those cases where the low-pressure shaft is decisive for disturbing vibrations while some disturbing influence is exerted by the high-pressure shaft as well.

In the following, the application of the present invention is specified for two-shaft engines. However, the present invention is also applicable for engines with any number of shafts.

Effect by Hydraulic Measures

According to the state of the art, individual engines or engine groups are operated in separate control circuits. More specifically, these control circuits are hydraulic operating circuits (e.g. for actuating the flaps or the undercarriage). In some engine designs, for example, two hydraulic pumps supply one circuit while in others they supply separate circuits. Depending on the arrangement and actuation of valves (addition of valves, if applicable), the engines can be made to contribute a different share to the hydraulic system, i.e. their loading and, in consequence, their parameters will change. Therefore, in the case of two-jet aircraft, these two circuits will mostly have separate tasks. Accordingly, a power exchange between the two engines can be effected by design changes. In the case of three-jet aircraft, the hydraulics of the third engine can be used as redundancy for the two other hydraulic systems. Accordingly, in this case, the power parameters of the engine can also be influenced according to the present invention. On four-jet aircraft, two engines are normally connected to one control circuit, i.e. a power change in terms of hydraulic loading can be used to effect a change of the power parameters of the engine also in the latter case.

A hydraulic coupling of the various shafts of an engine enables both rotational speeds (high-pressure shaft and low-pressure shaft) to be influenced (NL=f(NH)). In the function, NL indicates the rotational speed of the low-pressure shaft and NH indicates the rotational speed of the high-pressure shaft.

Effect by Electricity

The statements made in the above for the hydraulics apply almost similarly to electricity. However, in the case of electricity, the take-off of different power from the two engines can be effected much more easily. In the case of "fully electric" engines, power exchange of the individual engines and of shafts between engines can be accomplished very simply.

Effect by Customer Bleed

Normally, bleed air is tapped during the entire flight, this bleed air being fed by both engines into a common system. If the pressure loss between the point of tapping and mixture is different in the bleed-air systems of either engine, the mass flows will vary accordingly between the two engine systems. This variation will influence either of the two engines in a different manner and will finally result in minor speed changes which are utilizable for the effect according to the present invention.

Therefore, in accordance with the present invention, different conditions are produced in the individual bleed-air systems of the engines. As mentioned above, the rotational speeds of the low-pressure shaft and of the high-pressure shaft (NL or NH, respectively) vary with the differences in air bleed applied to either system. This variation is dependent of the type of control applied (speed of low-pressure shaft, NL or pressure ratio across the engine (thrust parameter, EPR)). Thus, according to the present invention, the regime of resonant vibrations is left.

The difference in the pressure loss by tapping of bleed air which is required can most simply be effected by individually setting the throttle valves available within the system. In extreme cases, one system is closed off completely while the other is left open. To a minor extent, it is also possible to cool the bleed air within the fan air-operated heat exchanger to a different degree. Accordingly, the different tapping of bleed air provides for a degree of freedom in terms of the optimization of the desired parameters (NL, NH, FN (net thrust)).

In the following, the changes proposed in the present invention are explained in light of three, typical flight phases. The tables show extreme cases for bleed air distribution between the two engines, starting with a typical value for the tapping of bleed air. The column headed "normal" shows the values applicable to the tapping of equal quantities of bleed air from both engines. The extreme case—double quantity of bleed air tapped from one engine, no bleed air tapped from the other engine—is shown in the columns headed "abnormal" and "none"

As a result of maximum air bleed, thrust will undergo various changes, these being due to the "EPR bleed air debits" provided in the calculation (EPR=pressure ratio across the engine (thrust parameter)). This uneven thrust distribution creates a yaw moment which is either desired or which must be corrected. In the first case, ΔNH obtained will be larger. In the simplest case, the yaw moment can be avoided by dispensing with the EPR debits. This characteristic, i.e. constant thrust, was approximated in the examples by using a constant NL in the calculation.

The results of the "normal" headed columns are the starting point for the calculations of EPR and NL controls. In the case of EPR controls, thrust, NL, NH etc. will change with air bleed. In the case of NL controls, NL and consequently thrust, by approximation, will remain unchanged, while NH will change.

Take-Off

TABLE 1

Take-off, EPR control
EPR control

| Bleed air | normal | abnormal | none | max. delta | Remarks |
|---|---|---|---|---|---|
| LP bleed air [lb/s] | 0.5 | 1.0 | 0.0 | 1.0 | Typical value |
| EPR [-] | 1.4991 | 1.4861 | 1.5144 | 0.0283 | |
| Net Thrust FN [lbf] | 11616.6 | 11372.1 | 11902.6 | 530.5 | Average thrust = 11637 lbf, i.e. 20.4 lbf higher |
| sfc [lb/(lbf * s)] | 0.4829 | 0.4858 | 0.4801 | 0.0057 | Average sfc unchanged |
| SOT [K] | 1499.2 | 1495.6 | 1504.5 | 8.9 | In the worst case, one engine is operated 5.3K hotter than normal |
| NL [rpm] | 6644.8 | 6599.0 | 6695.6 | 96.6 | |
| NH [rpm] | 14894.5 | 14866.5 | 14929.3 | 62.8 | |

TABLE 2

Take-off, NL control
NL control

| Bleed air | normal | abnormal | none | max. delta | Remarks |
|---|---|---|---|---|---|
| LP Bleed air [lb/s] | 0.5 | 1.0 | 0.0 | 1.0 | Typical value |
| EPR [-] | 1.4991 | 1.4993 | 1.4987 | 0.0006 | |
| Net Thrust FN [lbf] | 11616.6 | 11618.0 | 11615.3 | 2.7 | Average thrust = 11616.7 lbf, i.e. unchanged |
| sfc [lb/(lbf * s)] | 0.4829 | 0.4857 | 0.4801 | 0.0056 | Average sfc = 0.4829 => +0.0% |
| SOT [K] | 1499.2 | 1505.6 | 1492.8 | 12.8 | In the worst case, one engine is operated 6.4 K hotter than normal |
| NL [rpm] | 6644.8 | 6644.8 | 6644.8 | 0 | Set constant to obtain constant thrust! |
| NH [rpm] | 14894.5 | 14906.7 | 14882.3 | 24.4 | |

If the engine is not "derated", SOT will increase during take-off by 5.3 K (or 6.4 K). A maximum ΔNL of 96.6 rpm and a maximum ΔNH of 62.8 rpm can be achieved.

Cruise

TABLE 3

Cruise, EPR control
EPR control

| Bleed air | normal | abnormal | none | max. delta | Remarks |
|---|---|---|---|---|---|
| LP Bleed air [lb/s] | 0.5 | 1.0 | 0.0 | 1.0 | Typical value |
| EPR [-] | 1.6786 | 1.6552 | 1.6997 | 0.0445 | |
| Net Thrust FN [lbf] | 3682.9 | 3575.9 | 3780.6 | 204.7 | Average thrust = 3678.3 lbf |
| sfc [lb/(lbf * s)] | 0.6521 | 0.6581 | 0.6470 | 0.0111 | Average sfc = 0.65255 => +0.07% |
| SOT [K] | 1453.9 | 1451.0 | 1456.3 | 5.3 | In the worst case, one engine is operated 2.4K hotter than normal |
| NL [rpm] | 6793.4 | 6700.0 | 6883.3 | 183.3 | |
| NH [rpm] | 14235.7 | 14202.2 | 14265.0 | 62.8 | |

TABLE 4

Cruise, NL control
NL control

| Bleed air | normal | abnormal | none | max. delta | Remarks |
|---|---|---|---|---|---|
| LP Bleed air [lb/s] | 0.5 | 1.0 | 0.0 | 1.0 | Typical value |
| EPR [-] | 1.6786 | 1.6806 | 1.6759 | 0.0047 | |
| Net Thrust FN [lbf] | 3682.9 | 3683.2 | 3682.0 | 1.2 | Average thrust = 3682.6 lbf |
| sfc [lb/(lbf * s)] | 0.6521 | 0.6599 | 0.6442 | 0.0157 | Average sfc = 0.65205 => +0.0% |
| SOT [K] | 1453.9 | 1465.2 | 1442.5 | 22.7 | In the worst case, one engine is operated 11.3K hotter than normal |

TABLE 4-continued

Cruise, NL control
NL control

| Bleed air | normal | abnormal | none | max. delta | Remarks |
|---|---|---|---|---|---|
| NL [rpm] | 6793.4 | 6793.4 | 6793.4 | 0 | Set constant to obtain constant thrust! |
| NH [rpm] | 14235.7 | 14253.9 | 14216.5 | 37.4 | |

If the engine is not "derated", the SOT of one engine during cruise will increase by 2.4 K (or 11.3 K). A maximum ΔNL of 183.3 rpm and a maximum ΔNH of 62.8 rpm can be achieved.

Approach

TABLE 5

Approach, EPR control
EPR control

| Bleed air | normal | abnormal | none | max. delta | Remarks |
|---|---|---|---|---|---|
| HP Bleed air [lb/s] | 0.5 | 1.0 | 0.0 | 1.0 | Typical value |
| EPR [-] | 1.0132 | 1.0128 | 1.0136 | 0.0008 | |
| Net Thrust FN [lbf] | 732.9 | 712.4 | 752.0 | 39.6 | Average thrust = 732.2 lbf |
| Sfc [lb/(lbf * s)] | 1.1785 | 1.2360 | 1.1275 | 0.1085 | Average sfc = 1.1818 => +0.27% |
| SOT [K] | 972.1 | 988.0 | 957.8 | 30.2 | In the worst case, one engine is operated 15.9K hotter than normal |
| NL [rpm] | 2898.8 | 2876.9 | 2918.4 | 41.5 | |
| NH [rpm] | 11598.0 | 11598.0 | 11598.0 | 0 | Since controlled to HI, NHRT26 = const |

During approach, HI is automatically selected, which means that control is performed to NHRT26; consequently, the calculation here does not indicate a change in speed. Although HI is selected, control is frequently assumed by another control law (e.g. min P30) and can, therefore, be overridden by another parameter just as well, i.e. selection of bleed air, cf. table 6.

TABLE 6

Approach, NL control
NL control

| Bleed air | normal | abnormal | none | max. delta | Remarks |
|---|---|---|---|---|---|
| HP Bleed air [lb/s] | 0.5 | 1.0 | 0.0 | 1.0 | Typical value |
| EPR [-] | 1.0132 | 1.0138 | 1.0133 | 0.0006 | |
| Net Thrust FN [lbf] | 732.9 | 733.1 | 734.2 | 1.3 | 733.7 lbf |
| sfc [lb/(lbf * s)] | 1.1785 | 1.2138 | 1.1429 | 0.0709 | Average sfc = 1.17835 => −0.013% |
| SOT [K] | 972.1 | 989.7 | 956.0 | 33.7 | In the worst case, one engine is operated 27.6K hotter than normal. |
| NL [rpm] | 2898.8 | 2898.8 | 2898.8 | 0 | Set constant to obtain constant thrust! |
| NH [rpm] | 11598.0 | 11634.3 | 11560.7 | 73.6 | Only possible, if not controlled to HI. |

The increase of sfc with EPR control (more precisely HI control in this case) is quite irrelevant since this flight phase is relatively short. Also, the severe increase of SOT is not dramatic since it takes place from a low starting basis. The small changes in thrust, while probably not being verifiable physically, are assumed to arise from inaccuracies in the calculation program (iterative process).

As becomes apparent from the above, the present invention provides for measures which enable the development of noise and vibrations to be positively influenced by changing the critical excitation frequencies directly at the source, i.e. the engine, and by shifting them towards an uncritical frequency.

Accordingly, the noise level in the entire area of the cabin will be significantly reduced, in particular near the location of the engines. Furthermore, less attenuation material will be required, which allows the mass of the aircraft to be reduced. The present invention can be implemented by minor changes to the fuselage of the air-craft, this resulting in a very low overall investment. Additionally, the possibility to dispense with, or minimize, rudder trimming will result in reduced fuel consumption and, accordingly, in a larger range.

Summarizing, then, the present invention relates to the exchange, the take-off or addition of media and/or power between the individual shafts of an engine, between individual engines and between the engines and the aircraft. Thus, the present invention provides for additional degrees of freedom enabling engine parameters to be addressed in terms of a reduction or avoidance of negative resonances or beats.

The present invention relates to any number of engines on an aircraft and to any number of engine shafts. In accordance with the present invention, hydraulic power, electric power or air bleed can be influenced, for example.

List of Abbreviations

| | |
|---|---|
| EPR | Pressure ratio across the engine (thrust parameter) |
| FN | Net thrust |
| ISA | International standard atmosphere |
| NH | High-pressure shaft speed |
| NHRT26 | Aerodynamically corrected high-pressure shaft speed |
| NL | Low-pressure shaft speed |
| sfc | Specific fuel consumption |
| SOT | Total entry temperature at the high-pressure turbine |
| HI | High Idle |
| HP | High Pressure |

What is claimed is:

1. A method for the control of at least one engine of an aircraft, comprising: identifying an undesirable vibrational noise caused by at least one of: a first rotating shaft of the engine operating at a resonant frequency of the aircraft, and the first shaft operating at a speed different than that of a second shaft of the aircraft so as to create standing waves between the two rotating shafts, altering an amount of at least one of energy, fluid and other media that is at least one of supplied to and taken from the engine to alter the speed of the first shaft of the engine by an amount sufficient to reduce the undesirable vibrational noise.

2. The method of claim 1, wherein at least one of the energy, fluid and other media is taken from the engine.

3. The method of claim 2, wherein the energy is electric energy.

4. The method of claim 2, wherein the fluid is bleed air.

5. The method of claim 2, wherein the fluid is hydraulic fluid.

6. The method of claim 1, wherein at least one of the energy, fluid and other media is supplied to the engine.

7. The method of claim 6, wherein the fluid is bleed air.

8. The method of claim 6, wherein the fluid is hydraulic fluid.

9. The method of claim 6, wherein the energy is electric energy.

10. The method of claim 9, wherein the engine is a fully electric gas turbine.

11. The method of claim 1, wherein at least one of the energy, fluid and other media is taken from the engine and at least one of the energy, fluid and other media is supplied to a second engine.

12. A method for the control of at least one engine of an aircraft, wherein an amount of at least one of energy, fluid and other media that is at least one of supplied to and taken from the engine, is altered to alter the speed of at least one shaft of the engine, wherein the speed of the at least one shaft of the engine is altered with respect to at least a second shaft of the engine.

13. A method for the control of at least one engine of an aircraft, comprising: identifying an undesirable vibrational noise caused by the engine operating so as to emit an excitation frequency near a resonant frequency of the aircraft, altering an amount of at least one of energy, fluid and other media that is at least one of supplied to and taken from the engine to alter an excitation frequency of the engine by an amount sufficient to reduce the undesirable vibrational noise.

14. The method of claim 13, wherein at least one of the energy, fluid and other media is taken from the engine.

15. The method of claim 14, wherein the energy is electric energy.

16. The method of claim 14, wherein the fluid is bleed air.

17. The method of claim 14, wherein the fluid is hydraulic fluid.

18. The method of claim 13, wherein at least one of the energy, fluid and other media is supplied to the engine.

19. The method of claim 18, wherein the fluid is bleed air.

20. The method of claim 18, wherein the fluid is hydraulic fluid.

21. The method of claim 18, wherein the energy is electric energy.

22. The method of claim 21, wherein the engine is a fully electric gas turbine.

23. The method of claim 13, wherein at least one of the energy, fluid and other media is taken from the engine and at least one of the energy, fluid and other media is supplied to a second engine.

24. The method of claim 13, wherein at least one of the energy, fluid and other media is exchanged between the engine and a second engine.

25. A method for the control of at least one engine of an aircraft, wherein an amount of at least one of energy, fluid and other media that is at least one of supplied to and taken from the engine, is altered to alter an excitation frequency of the engine, wherein the excitation frequency of the engine is altered with respect to at least a second engine.

26. A method for the control of at least two engines of an aircraft, wherein each engine is constructed and arranged to supply a portion of a desired amount of at least one of electrical energy, bleed air and hydraulic fluid for use by the aircraft, wherein an amount of the at least one of electrical energy, bleed air and hydraulic fluid supplied by a first of the engines is altered with respect to an amount of the at least one of electrical energy, bleed air and hydraulic fluid supplied by at least a second of the engines to alter the speed of at least one shaft of the first engine with respect to at least one shaft of the second engine to reduce vibration of the aircraft.

27. The method of claim 26, wherein the amount of electrical energy supplied by the first engine is altered with respect to the amount of electrical energy supplied by the second engine.

28. The method of claim 26, wherein the amount of bleed air supplied by the first engine is altered with respect to the amount of bleed air supplied by the second engine.

29. The method of claim 26, wherein the amount of hydraulic fluid supplied by the first engine is altered with respect to the amount of hydraulic fluid supplied by the second engine.

30. The method of claim 26, wherein at least one of the electrical energy, bleed air and hydraulic fluid is taken from the first engine and supplied to the second engine.

* * * * *